() United States Patent  
Murfin

(10) Patent No.: US 6,253,488 B1  
(45) Date of Patent: Jul. 3, 2001

(54) TWO-PART PLANT POT HAVING A TRANSPARENT INTERNAL PLANT-GROWING VESSEL

(76) Inventor: Matthew Murfin, 49 Blackmore Crescent, Sheerwater, Woking, Surrey (GB), GU21 5NR ( * ) Notice: Subject to any disclaimer, the term of this patent is extended or adjusted under 35 U.S.C. 154(b) by 0 days.

(21) Appl. No.: 09/147,723

(22) PCT Filed: Oct. 28, 1997

(86) PCT No.: PCT/NZ97/00147

§ 371 Date: Apr. 23, 1999

§ 102(e) Date: Apr. 23, 1999

(87) PCT Pub. No.: WO98/19517

PCT Pub. Date: May 14, 1998

(30) Foreign Application Priority Data

Nov. 4, 1996 (NZ) ................................................ 299695

(51) Int. Cl.[7] ........................................................ A01G 9/02
(52) U.S. Cl. .............................. 47/65.7; 47/65.5; 220/455
(58) Field of Search .................................... 47/65.5, 65.7, 47/39, 66.1; 220/495.01, 23.91; 119/166

(56) References Cited

U.S. PATENT DOCUMENTS

| 540,681 | * | 6/1895 | Myers .................................. 47/39 |
| 2,971,493 | * | 2/1961 | Robb .................................. 119/166 |
| 3,653,362 | * | 4/1972 | Davis .............................. 220/495.01 |
| 3,698,594 | * | 10/1972 | Boehlert . |
| 3,903,644 | * | 9/1975 | Swift et al. .............................. 47/79 |
| 4,106,235 | * | 8/1978 | Smith .............................. 47/66.2 |
| 4,124,953 | * | 11/1978 | Patton .................................. 47/66 |
| 4,646,209 | * | 2/1987 | Jansen . |
| 4,747,701 | * | 5/1988 | Perkins ...................... 220/495.01 X |
| 5,117,584 | | 6/1992 | Ottenwalder et al. . |
| 5,211,133 | * | 5/1993 | Foley .................................. 119/166 |
| 5,502,924 | * | 4/1996 | Lee .................................... 47/79 |
| 5,517,947 | * | 5/1996 | Christman ........................ 119/166 |
| 5,525,505 | * | 6/1996 | Young et al. ........................ 47/66 X |
| 5,598,810 | * | 2/1997 | Lawton, III ...................... 119/166 |
| 5,921,025 | * | 7/1999 | Smith .................................... 47/79 |

FOREIGN PATENT DOCUMENTS

| 0 556 418 | * | 8/1993 | (EP) ...................................... 47/72 |
| 442171 | | 2/1936 | (GB) . |
| 1316159 | | 5/1973 | (GB) . |
| 2197574 | | 5/1988 | (GB) . |
| 2305839 | | 4/1997 | (GB) . |
| WO 88/00006 | * | 1/1988 | (WO) .................................. 47/65.5 |
| WO 90/08461 | * | 8/1990 | (WO) .................................... 47/81 |

* cited by examiner

Primary Examiner—Peter M. Poon  
Assistant Examiner—Andrea M. Valenti  
(74) Attorney, Agent, or Firm—Jacobson Holman PLLC

(57) ABSTRACT

A plant pot providing an internal plant growing vessel formed at least partially from a transparent material. The plant pot can be formed in two portions, an internal vessel and an external vessel. To allow the root and soil matrix condition to be viewed without lifting the plant out of its pot, the internal vessel is manufactured from a transparent material. The internal vessel may be supported within the exterior vessel by a rim or tabs projecting from the top of the internal vessel and bearing against the upper rim of the exterior vessel. Alternatively, a support may be located in the base part of the interior vessel and bear against the base part of the exterior vessel. The plant pot may have a variety of geometries including circular, rectangular, square and the like. The exterior vessel may be adapted so as to prevent the admission of light into the space between the interior and exterior vessels thereby avoiding root damage from prolonged exposure to light. The plant pot may find application in domestic garden situations, house plant environments as well as market gardens and other commercial environments.

20 Claims, 1 Drawing Sheet

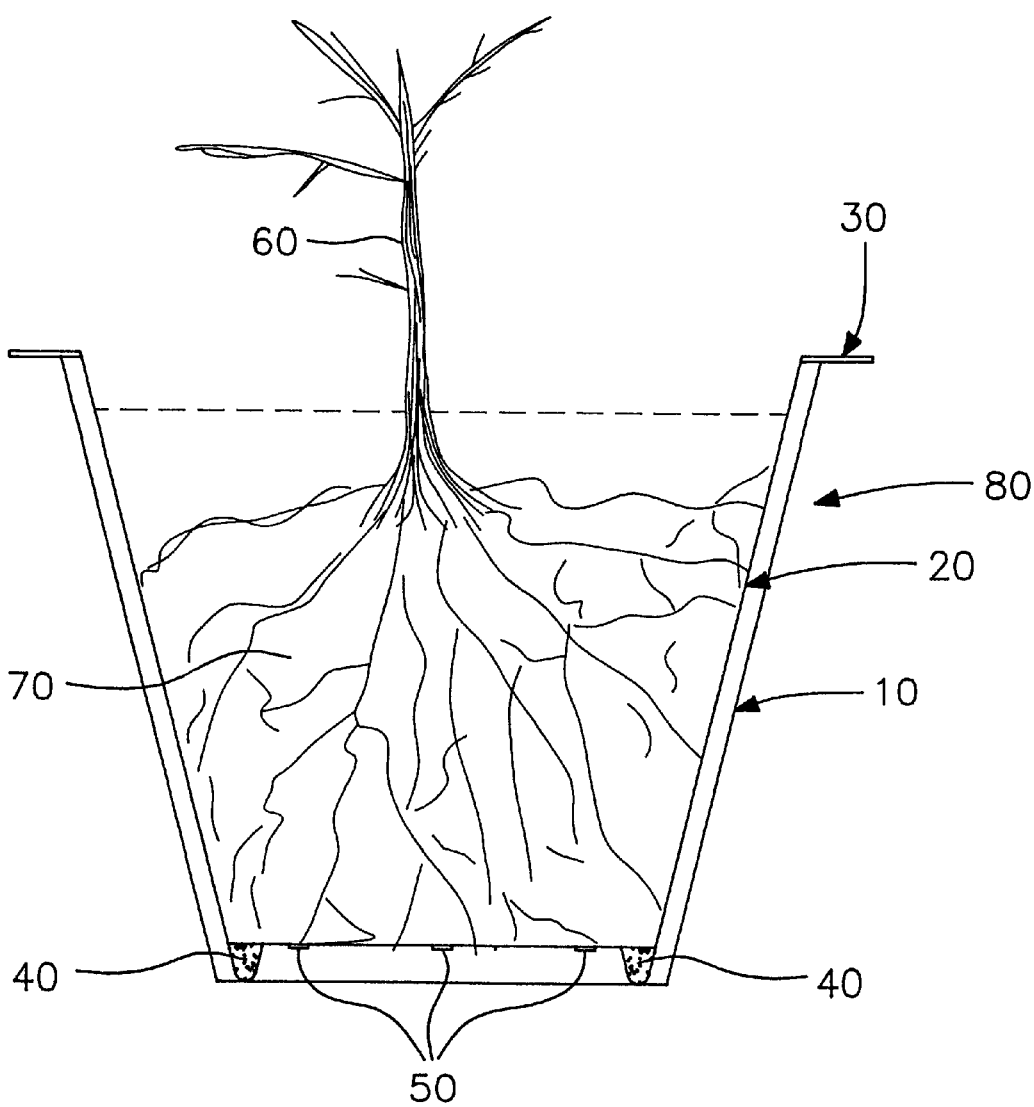

TWO-PART PLANT POT HAVING A TRANSPARENT INTERNAL PLANT-GROWING VESSEL

FIELD OF THE INVENTION

The present invention relates to plant pots. More particularly, although not exclusively, the present invention relates to a plant pot construction which allows for monitoring of the plant's condition, more specifically the plant's root condition and health.

BACKGROUND OF THE INVENTION

To the present time a commonly used method of planting or growing plants (indoor or outdoor) is to deposit them in a pot or similar containing vessel. The various techniques and soil compositions involved in growing plants in pots should be self-evident to one skilled in the art and will not be elaborated on any further.

During the life of a plant its root system will naturally grow and expand to use the available space within the pot. The condition of the root system and the environment in which it is placed will directly effect the health of the plant and its viability as an indoor or outdoor plant. It is known that as the root systems become larger the plant may become root bound and the root ball is compressed against the sides of the containing vessel (pot).

Potted plants are also susceptible to over-watering as occasionally insufficient or inefficient drainage is provided by casual or inexperienced gardeners. Over watering can adversely affect the growth and development of a pot plant and can, in some cases, provoke the development of root diseases.

Root diseases may also develop quite independently of the user's treatment of the pot plant and it is difficult to detect the presence of root diseases other than indirectly by observing the health of the plant.

One method of checking the roots of a plant which is commonly used, is for a plant carer to lift the plant temporarily out of the pot to visually examine its roots. This can damage the plant if the root ball and soil matrix is heavy or soft enough to fall apart when exposed. Under such circumstances, stem and root breakage can occur.

The present invention attempts to mitigate some of the abovementioned disadvantages by providing a plant pot construction which allows the condition of the root ball and associated area to be easily monitored. Further the invention provides an inexpensive and effective way of carrying out this function and provides the public with a useful choice.

DISCLOSURE OF THE INVENTION

According to a broadest aspect the present invention provides a vessel construction including:
an internal vessel adapted so that at least a portion of the internal vessel is transparent; and
an exterior vessel adapted to contain the interior vessel wherein the internal vessel may be supported within the exterior vessel by means of a plurality of tabs protruding from an upper rim of the internal vessel, wherein the tabs bear against an upper rim of the exterior vessel.

According to a further aspect, the present invention provides a plant growing vessel adapted to fit inside and/or be supported within an exterior vessel, wherein the plant growing vessel is at least partially formed from a substantially clear material.

In a second aspect the present invention provides a plant growing vessel construction including:
an internal plant vessel adapted so that at least a portion of the internal vessel is transparent; and
an exterior plant vessel adapted to contain the interior plant vessel wherein the internal vessel may be supported within the exterior vessel by means of a plurality of tabs protruding from an upper rim of the internal vessel, wherein the tabs bear against an upper rim of the exterior vessel.

Preferably the transparent portion of the internal vessel has a geometry and is dimensioned to allow the condition of the soil contained in the interior vessel and root ball to be observed without removing the plant from the interior plant vessel.

Preferably the entire internal vessel is constructed from a transparent material such as clear plastic.

The plant growing vessel construction may be of any geometry, shape or configuration adapted to suit the specific growing application which is required by the user.

Alternatively, the internal vessel may be supported within the external vessel by a continuous rim protruding from the upper rim of the internal vessel.

Alternatively, the internal vessel may be supported by support members protruding from a base part of the internal vessel, wherein the support members bear against an internal base part of the exterior vessel.

The internal vessel may be shorter in height than the exterior vessel.

The internal vessel is dimensioned to be capable of fitting within a variety of exterior vessel sizes and shapes.

The transparent portion of the interior vessel or the entire internal vessel may be constructed from clear plastic, glass or similar material.

The exterior vessel may be adapted to block light and thus heat entering a gap formed between the interior and exterior vessel.

BRIEF DESCRIPTION OF THE DRAWINGS

The present invention will now be described by way of example only and with reference to the FIGURE in which:

FIG. 1 illustrates a cross-sectional view through a plant growing vessel according to the invention.

Referring to FIG. 1, a transparent plant growing vessel 80 includes an internal vessel 20 and exterior vessel 10. The root and soil area is indicated by the numeral 70 and the stem of a plant by the numeral 60. The internal vessel 20 is, in the preferred embodiment, injection moulded or otherwise formed from a plastic material which is entirely transparent. Alternative embodiments may include an internal vessel having a strip, panel or window of transparent material located so that a user may observe a sufficient amount of the soil and root condition so as to be able to take appropriate action in case root diseases, over-watering, under-watering or root binding is observed.

The internal vessel 20 can incorporate stands 40 which hold the internal vessel 20 off the floor of the external vessel 10 and allow space for water to drain out of the soil area by means of drainage holes 50. Alternatively, and more preferred, the internal vessel can be supported by means of a rim or tabs 30 which bears against the upper rim edge of the exterior vessel 10. In a more preferred embodiment, this support is provided by tabs which are less obtrusive. In use, the plant 60 is potted in the interior plant vessel 20 according to techniques well known in the gardening field. The internal vessel 20 is then placed in the exterior vessel 10 which is generally opaque, and does not allow viewing of the root ball. A number of different configurations and shapes for the exterior vessel 10 are envisaged and it is possible that this component may correspond to a large number of presently available pots such as terra-cotta, plastic, pottery and the like pots. The internal vessel 20 is preferably of a shape adapted to snugly fit within the exterior vessel 10. However, a smaller interior vessel may be appropriate or convenient. Where the inner vessel is significantly smaller than the exterior vessel, the exterior vessel may be adapted to prevent light and therefore heat being admitted into the interstitial space between the interior and exterior vessel. This avoids root damage resulting from prolonged exposure to light causing an increase in the temperature of the roots.

Root exposure to light can also promote growth of moss which can adversely effect root development.

The user waters and cares for the plant according to known gardening techniques. When the user wishes to observe or monitor the condition of the soil and/or root ball, he or she simply lifts out the internal vessel 20 by means of a rim 30 or tabs which may be located so as to protrude above the rim of the exterior vessel 10. The plant and vessel may be lifted out of the exterior vessel 10 and condition of the soil observed immediately. This provides a significant advantage in that the soil need not be disturbed or the plant removed in order to check the condition of the soil and root ball.

After checking, the user may easily place the internal vessel 20 back into the exterior vessel 10 whereby the plant and pot gives the viewer the impression of being a standard potted plant within a conventional pot. A particular advantage is that, in contrast to lifting the plant our of its pot by its stem, the root condition can be checked without the risk of damage to the stem, root or soil matrix. A further advantage of the invention is that the easy removal and examination of the inner pot will prompt plant carers to regularly check the condition of the plant. This is due to the relative ease in removing and examining the internal vessel.

There are many durable plastics materials which provide for a solid, transparent construction available on the market and it is envisaged that the internal vessel 20 may be constructed from such materials. Alternatively, glass may be used.

FIG. 1 illustrates a circular (not shown) pot when viewed from above. However, this is not intended to be limiting and it is envisaged that the principle could be applied to other shaped vessels such as troughs, cylinders, or shallow dishes.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope of the appended claims.

What is claimed is:

1. A vessel construction comprising:
   an internal vessel having at least a portion being transparent, said transparent portion being made of a transparent material; and
   an exterior vessel adapted to contain the internal vessel, the internal vessel being supported within the exterior vessel by a plurality of tabs protruding from a top edge of a wall of the internal vessel, wherein the tabs bear against a top edge of a wall of the exterior vessel.

2. A plant growing vessel construction comprising:
   an internal plant vessel having at least a portion being transparent, said transparent portion being made of a transparent material; and
   an exterior plant vessel adapted to contain the internal plant vessel, the internal plant vessel being supported within the exterior plant vessel by a plurality of tabs protruding from a top edge of a wall of the internal plant vessel, wherein the tabs bear against a top edge of a wall of the exterior plant vessel.

3. A plant growing vessel as claimed in claim 2, wherein the transparent portion of the internal plant vessel is of a geometry and dimension to allow the condition of the soil contained in the internal plant vessel and root ball to be observed without removing a plant from the internal plant vessel.

4. A plant growing vessel as claimed in claim 2, wherein the entire internal plant vessel is constructed from a transparent plastic material.

5. A plant growing vessel as claimed in claim 2, wherein the internal plant vessel is shorter in height than the exterior plant vessel.

6. A plant growing vessel as claimed in claim 2, wherein the internal plant vessel is dimensioned to fit a variety of exterior plant vessel sizes and shapes.

7. A plant growing vessel as claimed in claim 2, wherein the transparent portion of the internal plant vessel or the entire internal plant vessel is constructed from one of clear plastic and glass.

8. A plant growing vessel as claimed in claim 2, wherein the exterior plant vessel is adapted to block light entering a gap formed between the interior and exterior plant vessels.

9. A plant growing vessel as claimed in claim 2, wherein the internal plant vessel is circular in shape.

10. A plant growing vessel construction comprising:
    an internal plant vessel having at least a portion being transparent, said transparent portion being made of a transparent material; and
    an exterior plant vessel adapted to contain the internal plant vessel, the internal plant vessel being supported within the exterior plant vessel by a continuous rim protruding from a top edge of a wall of the internal plant vessel, wherein the continuous rim bears against a top edge of a wall of the exterior plant vessel.

11. A plant growing vessel as claimed in claim 10, wherein the transparent portion of the internal plant vessel is of a geometry and dimension to allow the condition of the soil contained in the internal plant vessel and root ball to be observed without removing a plant from the internal plant vessel.

12. A plant growing vessel as claimed in claim 10, wherein the internal plant vessel is circular in shape.

13. A plant growing vessel as claimed in claim 10, wherein the entire internal plant vessel is constructed from a transparent plastic material.

14. A plant growing vessel as claimed in claim 10, wherein the internal plant vessel is further supported by support members protruding from a base part of the internal plant vessel, wherein the support members bear against an internal base part of the exterior plant vessel.

15. A plant growing vessel as claimed in claim 10, wherein the internal plant vessel is shorter in height than the exterior plant vessel.

16. A plant growing vessel as claimed in claim 10, wherein the internal plant vessel is dimensioned to fit a variety of exterior vessel sizes and shapes.

17. A plant growing vessel as claimed in claim 10, wherein the transparent portion of inter interior plant vessel or the entire interior plant vessel is constructed from one of clear plastic and glass.

18. A plant growing vessel as claimed in claim 10, wherein the exterior plant vessel is adapted to block light entering a gap formed between the interior and exterior plant vessels.

19. A plant growing vessel construction comprising:

an internal plant vessel having at least a portion being transparent, said transparent portion being made of a transparent material; and an exterior plant vessel adapted to contain the internal plant vessel, the internal vessel being supported within the exterior plant vessel by a continuous rim protruding from a top edge of a wall of the internal plant vessel, wherein the continuous rim bears against a top edge of a wall of the exterior plant vessel, and wherein the internal plant vessel is dimensioned to fit a variety of exterior vessel shapes and sizes.

20. A plant growing vessel construction comprising:

an internal plant vessel having at least a portion being transparent, said transparent portion being made of a transparent material; and an exterior plant vessel adapted to contain the internal plant vessel, the internal plant vessel being supported within the exterior plant vessel by a plurality of tabs protruding from a top edge of a wall of the internal plant vessel, wherein the tabs bear against a top edge of a wall of the exterior plant vessel;

the internal plant vessel being supported by support members protruding from a base part of the internal plant vessel, the support members bearing against an internal base part of the exterior plant vessel.

* * * * *